US011009918B2

(12) United States Patent
Oakeson et al.

(10) Patent No.: US 11,009,918 B2
(45) Date of Patent: May 18, 2021

(54) KEYBOARD FOLIO WITH MAGNETIC ATTACHMENT

(71) Applicant: ZAGG Intellectual Property Holding Co., Inc., Midvale, UT (US)

(72) Inventors: Dan Oakeson, West Jordan, UT (US); Cecily Sabin, Salt Lake City, UT (US); Jeff Meek, Draper, UT (US); Manuel Carreon, Lehi, UT (US); Randy Hales, Draper, UT (US)

(73) Assignee: ZAGG Intellectual Property Holding Co., Inc., Midvale, UT (US)

( * ) Notice: Subject to any disclaimer, the term of this patent is extended or adjusted under 35 U.S.C. 154(b) by 24 days.

(21) Appl. No.: 16/240,167

(22) Filed: Jan. 4, 2019

(65) Prior Publication Data

US 2019/0212784 A1    Jul. 11, 2019

Related U.S. Application Data

(60) Provisional application No. 62/613,848, filed on Jan. 5, 2018.

(51) Int. Cl.
*G06F 1/16* (2006.01)
*G06F 3/023* (2006.01)
*G06F 3/02* (2006.01)

(52) U.S. Cl.
CPC ............ *G06F 1/1669* (2013.01); *G06F 1/166* (2013.01); *G06F 1/1632* (2013.01); *G06F 3/0202* (2013.01); *G06F 3/0219* (2013.01); *G06F 3/0231* (2013.01)

(58) Field of Classification Search
CPC ...... G06F 1/1669; G06F 1/1632; G06F 1/166; G06F 3/0231
See application file for complete search history.

(56) References Cited

U.S. PATENT DOCUMENTS

| | | | |
|---|---|---|---|
| 8,917,499 B1 | 12/2014 | Read | |
| 9,483,083 B1* | 11/2016 | Zaloom | G06F 1/1679 |
| 9,489,054 B1* | 11/2016 | Sumsion | G06F 3/0208 |
| 9,557,776 B1 | 1/2017 | Oakeson | |
| 9,778,702 B2* | 10/2017 | Song | G06F 1/1667 |
| 10,001,242 B2* | 6/2018 | van Hooft | G06F 1/1616 |
| 2007/0097087 A1* | 5/2007 | Homer | G06F 1/1626 345/173 |
| 2012/0287565 A1* | 11/2012 | Bennett, Jr. | A45C 11/00 361/679.01 |
| 2013/0058023 A1* | 3/2013 | Supran | G06F 1/1632 361/679.01 |
| 2014/0347814 A1* | 11/2014 | Zaloom | G06F 1/1626 361/679.56 |

(Continued)

*Primary Examiner* — James Wu
*Assistant Examiner* — Christopher L Augustin
(74) *Attorney, Agent, or Firm* — Thorpe, North & Western, LLP (57) ABSTRACT

A keyboard folio for a tablet computer provides a case and a wireless keyboard. A connection utilizes a magnetic attachment and an insert to adapt to the tablet computer. The panel has a bottom ledge to receive the tablet computer on the bottom ledge. In addition, the panel has ferromagnetic elements to magnetically attach to an attachment plate adhered to the tablet computer. The panel and the wireless keyboard can be releasably attached together with a magnetic attachment.

19 Claims, 10 Drawing Sheets

(56) References Cited

U.S. PATENT DOCUMENTS

| | | | |
|---|---|---|---|
| 2015/0277509 A1* | 10/2015 | Probst | G06F 1/1616 361/679.12 |
| 2016/0018854 A1* | 1/2016 | Yu | G06F 1/1669 361/679.08 |
| 2016/0028428 A1* | 1/2016 | Sturniolo | A45C 11/00 455/575.8 |
| 2016/0246328 A1* | 8/2016 | Christie, II | G06F 1/1632 |
| 2018/0059723 A1* | 3/2018 | Wu | G06F 1/1632 |
| 2019/0056763 A1* | 2/2019 | Tsai | G06F 1/1626 |

* cited by examiner

KEYBOARD FOLIO WITH MAGNETIC ATTACHMENT

PRIORITY CLAIM(S)

Priority is claimed to U.S. Provisional Patent Application No. 62/613,848, filed Jan. 5, 2018, which is hereby incorporated herein by reference.

BACKGROUND

Tablet computers or tablets, such as the Apple® iPad® tablet computer, have grown in popularity. Such tablet computers are often thin, rectilinear computers with a broad touch screen that can offer media viewing and user input through a graphical keyboard. Such tablet computers can also have a patterned magnet array to magnetically attach to a cover.

Tablet computers risk damage from dropping because their small size and light weight promote mobility and holding. Often, the tablet computer has a slim, streamline case that is aesthetically pleasing but difficult to grasp and hold. User's often supplement the tablet computer with a case or folio to protect the screen and the tablet computer. Such cases or folios can often enclose or envelope the back, edges, and front perimeter of the tablet computer. Other cases can grip the tablet computer.

Typing or keyed entry on the tablet computers can be difficult due to the lack of haptic or tactile response of the graphical keyboard, and the large amount of space required by the graphical keyboard leaves a small viewing area. User's often supplement the tablet computer with a wireless keyboard to facilitate typing or keyed entry. Such wireless keyboards can also be incorporated into the case or folio. Again, such cases or folios can often enclose or envelope the back, edges, and front perimeter of the tablet computer.

Some cases or folios can maintain a viewing angle of the tablet by a hinge between the case and the keyboard. Other keyboards or cases have a complicated folding geometry.

The popularity of tablet computers has resulted in a growing number of manufactures and a growing number of types and styles, many with various different dimensions. Thus, cases or folios are continuously redesigned to accommodate the different and varying dimensions of the tablet computers, resulting in higher costs, greater warehousing and stock, and obsolescence.

The improvement of protection and utility for tablet computers is on ongoing endeavor.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 8 is a front perspective view of the panel of the keyboard folio of FIG. 1a, shown with the insert and the attachment panel removed.

FIG. 9 is a rear perspective view of the panel of the keyboard folio of FIG. 1a.

FIG. 12 is a rear view of the keyboard folio of FIG. 1a.

FIG. 18 is a bottom view of the keyboard folio of FIG. 1a.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

The terms "tablet computer" and "tablet" are used interchangeably herein to refer to a computer or multi-media device that is one-piece with a screen and that is portable and handheld. Examples of tablets include the Apple™ iPad™, the Samsung™ Galaxy™ Tab™, etc. The screen can be a touch screen that can receive input by touch, such as finger swipes, and/or can have a virtual keyboard. The tablet can have a battery and memory and a processor with software running thereon. The tablet can have WiFi and Bluetooth connectivity, and can have a wireless transmitter, receiver, or transceiver. Thus, the tablet can provide internet browsing, game playing, movie and picture display, e-book display, etc. In addition, the tablet can include a digital camera. Furthermore, the terms tablet computer and tablet are used broadly herein to refer to cellular or cell phones (or smart phones) and phablets, which also provide similar computing capabilities, battery power, memory, processor, software, WiFi and Bluetooth connectivity, transceiver, touch screen display, digital camera, etc. Examples of cell phones and phablets include the Apple iPhone, the Samsung Galaxy S phone series, the Samsung Note series, etc.

In addition, the terms "tablet computer" or "tablet" include any protective or decorative case or skin or film attached to the tablet. For example, the phrase "attached to a tablet computer," or "attached to a surface of a tablet computer," or "attached to a face of a tablet computer" is intended to mean directly attached to the tablet computer, as well as indirectly attached by way of being attached to a protective or decorative case, skin or film.

The term "keyboard" refers to an array or matrix of alphanumeric (both alphabetical and/or numeric) or character keys, modifier keys for altering the functions of other keys, navigation keys for moving the text cursor on a display, function keys and/or system command keys. The keyboard can have a keyboard layout with keys arranged in an acceptable format or standard, such as the QWERTY layout. The keyboard layout can include three rows of characters or letters, a row of numbers above the characters, and one or two rows of other keys, such as a space bar, modifier keys, function keys, navigations keys, etc., for a total of five or six rows. Most of the keys can be square or rectilinear buttons of the same size and shape. In addition, the keys can be buttons capable of registering contact, pressure or force from a user's fingers. The keys or buttons can use any appropriate switch technology; including for example, membrane, dome-switch, scissor-switch, capacitive, mechanical-switch, buckle spring, Hall effect, laser, optical, etc. The keys, buttons and/or switches can provide a feedback response and can have a travel distance. Furthermore, the keyboard can be part of, or can itself form, a leaf or a panel that can be removably coupled to a tablet, and that can form a cover for a tablet. In use, the keyboard can be physically; but not electrically coupled to the tablet; or can be remote from the tablet. When not in use, the keyboard can be physically, but not electrically, coupled to the tablet. In addition, the keyboard or cover can include battery power, a wireless transmitter, receiver, or transceiver; a memory, a processor, and software. In one aspect, the keyboard can include WiFi and Bluetooth connectivity. In another aspect, the keyboard can include a physical and electrical connection. Thus, they keyboard can have both a physical and a communication connection with the tablet.

The term "ferromagnetic" is used herein to refer to a material or element that has magnetic properties and/or an ability to magnetically couple; either by being magnetic, or being magnetically attracted to a magnet (such as by containing iron) such that one ferromagnetic material or element is magnetically attracted to another ferromagnetic material or element. Thus, a ferromagnetic element can be a magnet or can be magnetic, such as a permanent magnet, or is attracted to magnets, such as by containing iron.

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

The invention presents a keyboard folio for a tablet computer. The keyboard folio provides both a case to protect the tablet computer, and a wireless keyboard to enhance the functionality of the tablet computer and to facilitate interface connectivity with the tablet computer. The keyboard folio provides a connection that utilizes a magnetic attachment as well as an insert to adapt to a particular type, style, size and/or manufacturer of the tablet computer. Thus, the keyboard folio can be adapted for varies different types, styles, sizes and/or manufacturers of tablet computers. Such a configuration can eliminate excess stock and lead times for manufacture.

The keyboard folio comprises a wireless keyboard removably coupled to a panel. The panel receives and carries the tablet computer, and has a kickstand to orient the panel, and thus the tablet computer. The panel has a bottom ledge and an open perimeter to receive the tablet computer on the bottom ledge and against the panel. In addition, the panel can have ferromagnetic elements to magnetically attach to an attachment plate adhered to the tablet computer. Thus, the tablet computer is magnetically attached to the panel. The panel can be adapted to receive and hold a tablet computer of any size or shape.

The panel and the wireless keyboard can be pivotally coupled together. The wireless keyboard and the panel can pivot between a closed position in which the panel is oriented opposite the wireless keyboard, and an open position in with the panel is oriented transverse to the wireless keyboard. In addition, the panel and the wireless keyboard can be releasably attached together with a magnetic attachment. The bottom edge of the panel can have an elongated slot, and the wireless keyboard can have an elongated bar removably received in the elongated slot. The elongated slot and the elongated bar can have ferromagnetic elements to magnetically attach the bar in the slot. A flexible hinge can couple the elongated bar to the wireless keyboard. The flexible hinge allows the elongated bar, and thus the panel and the tablet computer, to pivot with respect to the wireless keyboard. The kickstand can be coupled to the shell near the bottom ledge.

Referring to FIGS. 1a-20, a keyboard folio 10 is shown in an exemplary embodiment of the present invention for use with a tablet computer 14. The keyboard folio 10 comprises a wireless keyboard 18 pivotally and removably coupled to a panel 22. The panel 22 can be adapted to receive and hold the tablet 14. In addition, the panel 22 can be adapted to receive one of many different tablets with different dimensions and shapes. The panel 22 can be substantially flat and open, as opposed to a shell with a cavity to encase the tablet.

The panel 22 can have a perimeter with an open portion. For example, the panel 22 can be substantially open on at least a portion of two of four sides, including opposite lateral sides. The panel 22 can have a bottom ledge 26 that can receive an edge of the tablet 14 thereon. The panel 22 can also have a top edge 30 opposite the bottom ledge 26. In addition, the panel 22 can have an interior or front face 34 (FIG. 5) that can oppose a back of the tablet 14 when the tablet 14 is coupled to the panel 22. The bottom ledge 26 can have a transverse lip 38 (FIG. 6) oriented substantially perpendicularly to the interior face 34 of the panel 22, and that opposes the edge of the tablet 14 and receives the edge of the tablet 14 hereon. The bottom ledge 26 can extend forwardly beyond the interior face 34 of the panel 14, and can itself have a forward face 42 substantially parallel with the interior face 34 of the panel 22. The bottom ledge 26 can extend an entire width of the panel 22, and an entire width of the interior face 34. In addition, the bottom ledge 26 can form a portion of a perimeter of the panel 22. The bottom ledge 26 can define a bottom edge 46 of the panel 22.

In one aspect, the bottom ledge 26 can be shaped with both an indentation 50 in a plane of the panel 22, and a channel or groove 54 parallel to the plane of the panel. The indentation 50 can have raised edges 58 on the lateral sides to resist lateral sliding of the tablet 14 on the bottom ledge 26. In addition, the groove 54 can have a raised front lip to resist sliding of the tablet 14 away from the panel 22.

In another aspect, the panel 22 can have one or more upper corners 62 extending outward from the interior face 34. The corners 62 can extend along a portion of the top edge 30 and a contiguous side edge of the panel 22. The corners 62 can be part of the top edge 30. The corners 62 can help contain the tablet 14 on the panel 22. In one aspect, the tablet 14 can be contained within a perimeter of the panel 22, such as in a landscape orientation. Thus, the perimeter of the panel 22 can extend beyond a perimeter of the tablet computer 14. In another aspect, a gap can be formed between the corners 62 to allow the tablet 14 to extend beyond an upper perimeter of the panel 22, such as in a portrait orientation. Thus, the perimeter of the panel 22 can extend beyond a perimeter of the tablet computer 14 on the three of four sides. The tablet computer 14 can have two configurations, including: a landscape orientation and a portrait orientation. In the landscape orientation, a width of the tablet is oriented vertically and a height of the tablet is oriented horizontally, with the height being greater than the width. In the portrait orientation, the width of the tablet is oriented horizontally and the height of the tablet is oriented vertically, and with the tablet computer extending beyond the top edge 30 of the panel 22. The corners 62 can be formed with the panel 22.

The panel 22 can be formed of plastic and can be formed by injection molding. The panel 22 can be relatively rigid.

In addition, the panel 22 can have a recess 66 (FIGS. 5 and 6) in the intermediate portion of the panel 22. The recess 66 can extend into the interior face 34 of the panel 22, and can face a back of the tablet computer 14 when the tablet computer 14 is carried by the panel 22. The panel 22 and the recess 66 can have a ferromagnetic element 70 carried by the panel 22 and located at a bottom of the recess 66. In one aspect, the ferromagnetic element 70 can be multiple ferromagnetic elements 70, such as four elements located at corners of the recess 66.

Figure 3:
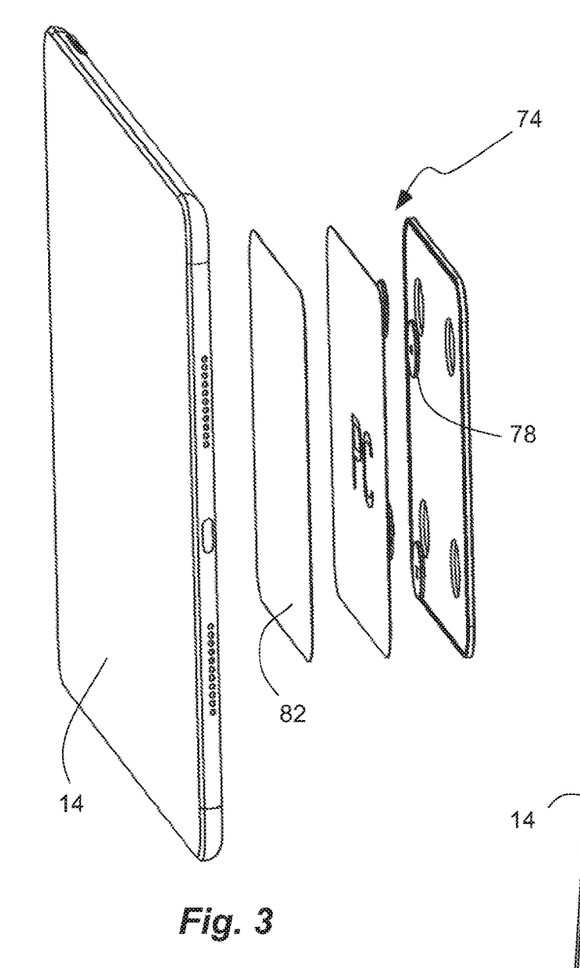
FIG. 3 is an exploded perspective view of an attachment plate of the keyboard folio of FIG. 1a, shown with the tablet computer.
Figure 4:
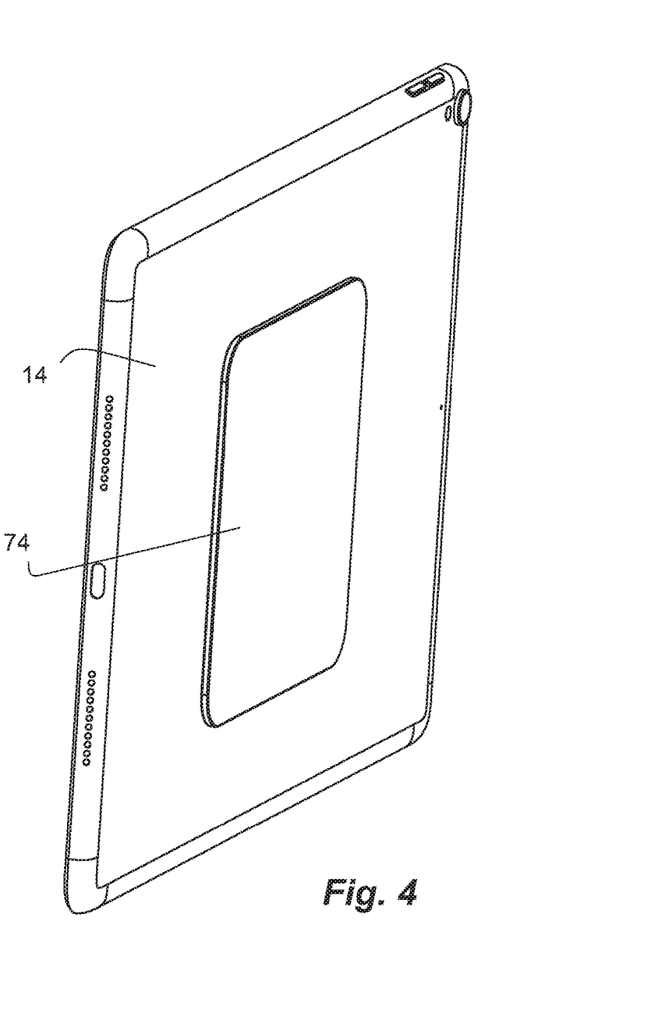
FIG. 4 is a rear perspective view of the attachment plate of the keyboard folio of FIG. 1a, shown with the tablet computer.

An attachment plate 74 can magnetically couple the tablet 14 to the panel 22. The attachment plate 74 can have ferromagnetic characteristics, such as a ferromagnetic element 78. In one aspect, the attachment plate 78 can comprise a metal plate with iron therein. In another aspect, the attachment plate 78 can comprise a magnetic element 78. In another aspect, the magnetic element 78 can comprise multiple magnetic elements 78, such as four elements located at corners of the plate 74 and corresponding to the elements 70 of the recess 66. The attachment plate 78 can have hollows receiving the magnetic elements 78 therein. The attachment plate 78 has opposite faces including a panel face and a tablet computer face. The panel face can couple to the panel 22, while the tablet computer face can couple to the tablet 14. An adhesive 82 can be disposed on the tablet computer face of the attachment plate 74 to adhere the attachment plate 74 to the tablet computer 14. The panel face of the attachment plate 40 can releasably and magnetically attached to the panel 22, and thus can releasably and magnetically attach the tablet computer 14, to the panel 22. The tablet computer 14 is adhered to the attachment plate 74, and is magnetically coupled to the panel 22 via the attachment plate 74. The attachment plate 74 is removably disposed in the recess 66 when the tablet 14 is carried by the panel 22. In one aspect, the attachment plate 74 can have a size and shape substantially matching a size and shape of the recess 66, to further resist lateral movement of the tablet 14 with respect to the panel 22. The depth of the recess 66 and the thickness of the plate 74 can be sized so that tablet 14 can be flush with back of panel 22.

In another aspect, the keyboard folio 10 and the panel 22 can be provided with an insert 86 that is removably coupled to a top of the panel 22, and fills a gap between a top edge of the tablet computer 14 and the top edge 30 of the panel 22. In one aspect, the insert 86 can close an upper perimeter or top end of the panel 22. The insert 86 can have a top edge 90, similar to the bottom ledge 26, with an indentation and a groove similar to the bottom ledge 26, to help retain the tablet 14. The top edge 90 of the insert 86 opposes the bottom ledge 26 of the panel 22. The top edge 90 of the insert 86 is opposite the bottom ledge 26, with a distance between the top edge 90 and the bottom ledge 26 configured to match a width of the tablet computer 14.

In one aspect, the insert 86 can have tabs extending into slots in the corners 62 and/or the top edge 30 to retain the inserts to the panel 22. The insert 86 can be more flexible than the shell 22. The insert 86 can be provided with button pass throughs that can flex under pressure to transfer force from an exterior perimeter of the insert 86, to a button of the tablet computer 14. The top of the panel 22 can have a cavity 92 (FIG. 8) that can selectively receive the insert 86. In another aspect, the panel 22 can have a lip 94 (FIGS. 6 and 8) extending around the outer perimeter of the cavity 92, and the insert 98 can have a perimeter channel 96 (FIGS. 6 and 7) to receive the lip 94, to provide rigidity to the top edge 90 and to help secure the insert 98 to the panel 22.

A plurality of different inserts 86 can be provided and can be separately and selectively couplable to the panel 22. Each of the plurality of different inserts 86 can have a size and shape to match and mate with a different tablet computer. Thus, one insert 86 can have a thicker top edge 90, while another insert can have a thinner top edge. Thus, the keyboard folio 10 and the panel 22 can be configured to accommodate different styles, sizes, manufactures, or versions of tablet computers. As newer or different tablet computers become available, a new insert can be provided to accommodate the new tablet computer with the existing keyboard folio 10 and panel 22. The inserts 86 can provide a more custom fit of the keyboard folio 10 and the panel 22 to the tablet 14, while allowing the keyboard folio 10 and the panel 22 to be used with different tablets, or progressively different tablets. Thus, a single keyboard folio 10 and a single panel 22 can be manufactured to accommodate a number of different tablets with different inserts 86. In addition, the inserts 86 can also align the tablet 14 with the panel 22, as discussed in greater detail below.

In another aspect, a slot 98 (FIG. 8) can extend through the panel 22 near the top end. A tab 102 can extend from the insert 86 and into the slot 98. The tab 102 can help secure the insert 86 to the panel 22. The tab 102 can be as wide, or wider, than the slot 98 to retain the tab 102 in the slot 98. In one aspect, the tab 102 can be flush with the opposite side of the panel 22, and can close the slot 98. In another aspect, a loop or a channel 106 can be disposed on the tab 102 and positioned on a back side of the panel 22 to receive a stylus.

In another aspect, as described above, a portion of the panel 22 can be open, such as a top portion. The insert 86 can close a remaining top side of the panel 22.

As described above, the wireless keyboard 18 is coupled to the panel 22, both pivotally, and releasably and detachably. The wireless keyboard 18 and the panel 22 can pivot between a closed position in which the panel 22 is oriented opposite the wireless keyboard 18 (FIGS. 1a, 1b, 10, 11 and 12), and an open position in which the panel 22 is oriented transverse to the wireless keyboard 18 (FIGS. 14-20). In addition, the wireless keyboard 18 is magnetically coupled to the panel 22 so that the wireless keyboard 18 can be selectively attached and detached from the panel 22, and thus the tablet 14.

Figure 6:
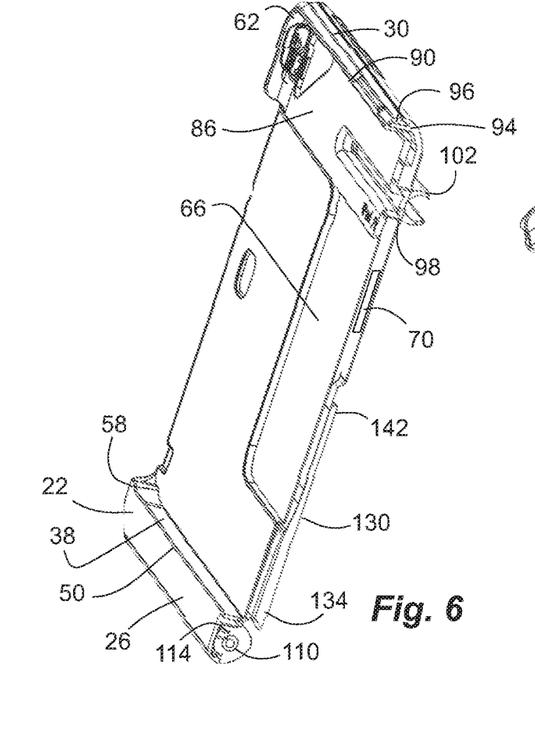
FIG. 6 is a cross-sectional side perspective view of the panel of the keyboard folio of FIG. 1a, taken along line 6 of FIG. 5.
Figure 7:
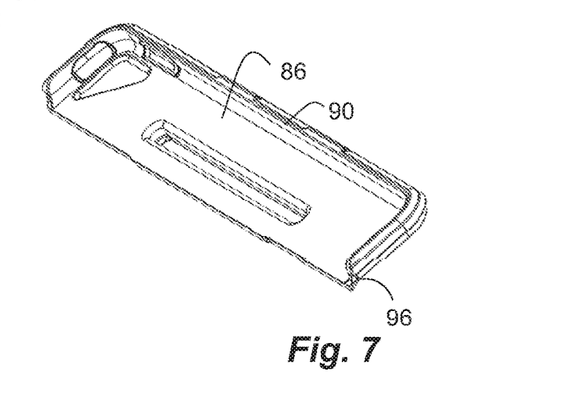
FIG. 7 is a perspective view of an insert of the keyboard folio of FIG. 1a, shown removed from the panel.
Figures 8, 9:
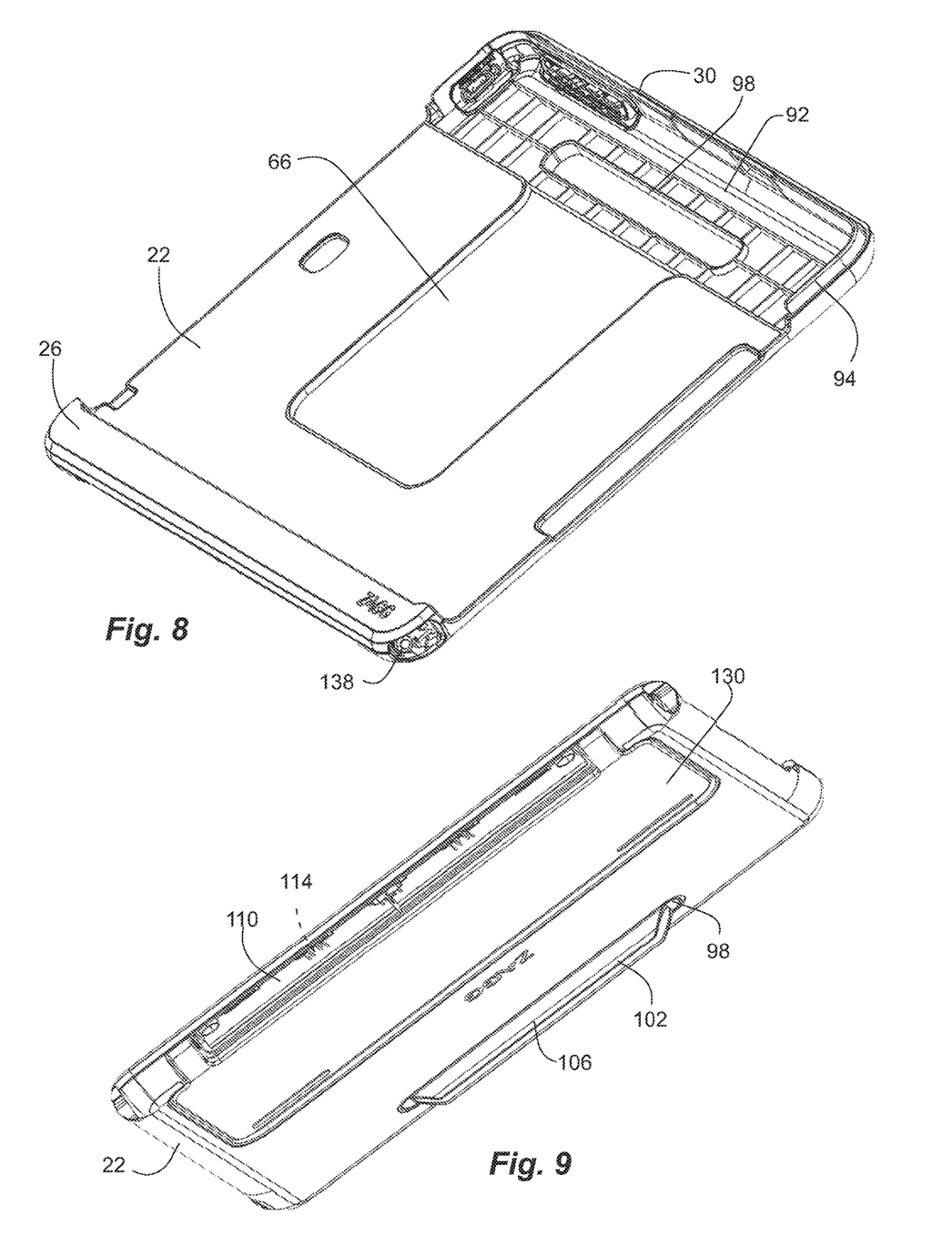
Figure 10:
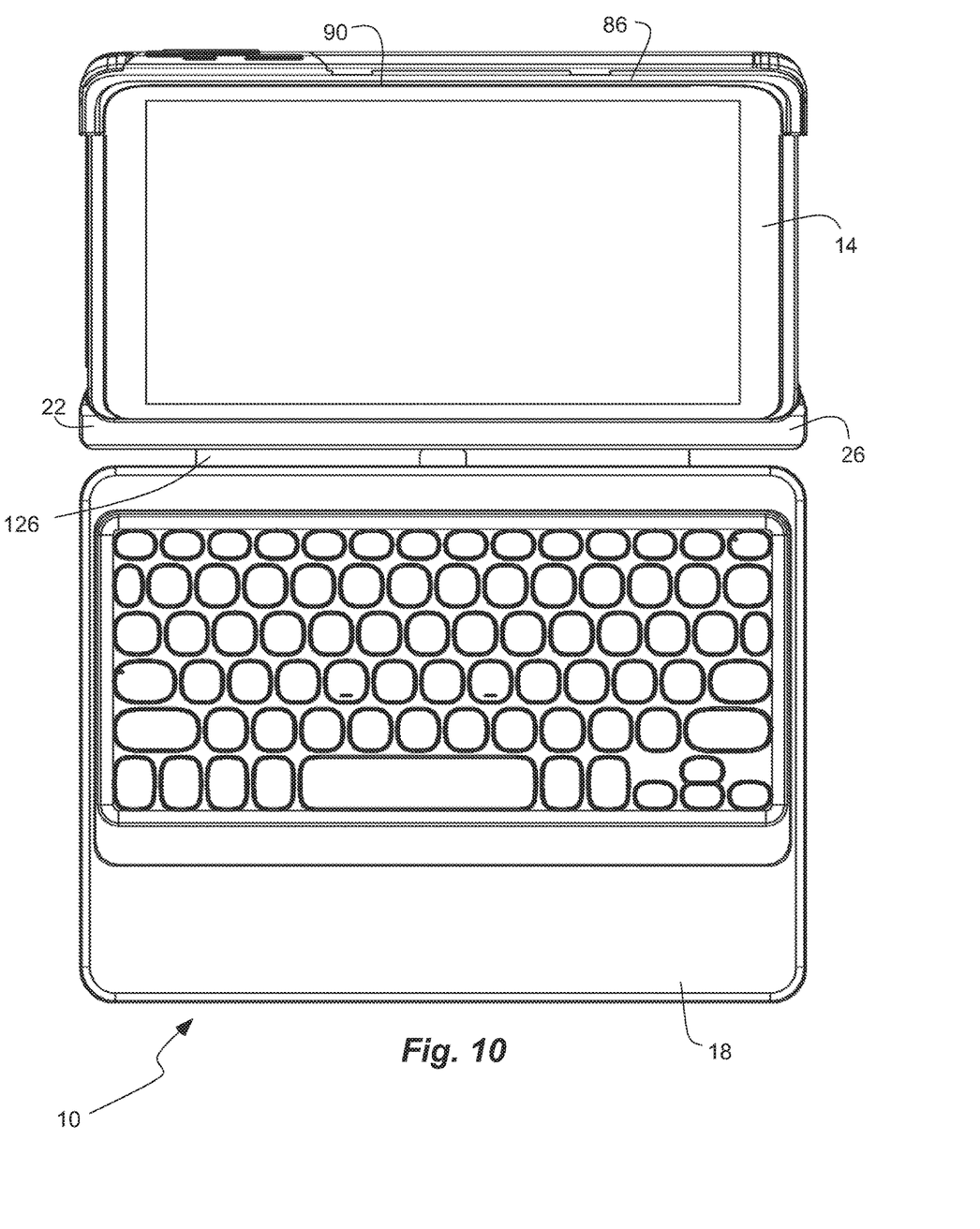
FIG. 10 is a top view of the keyboard folio of FIG. 1a, shown with the tablet computer therein.
Figure 11:
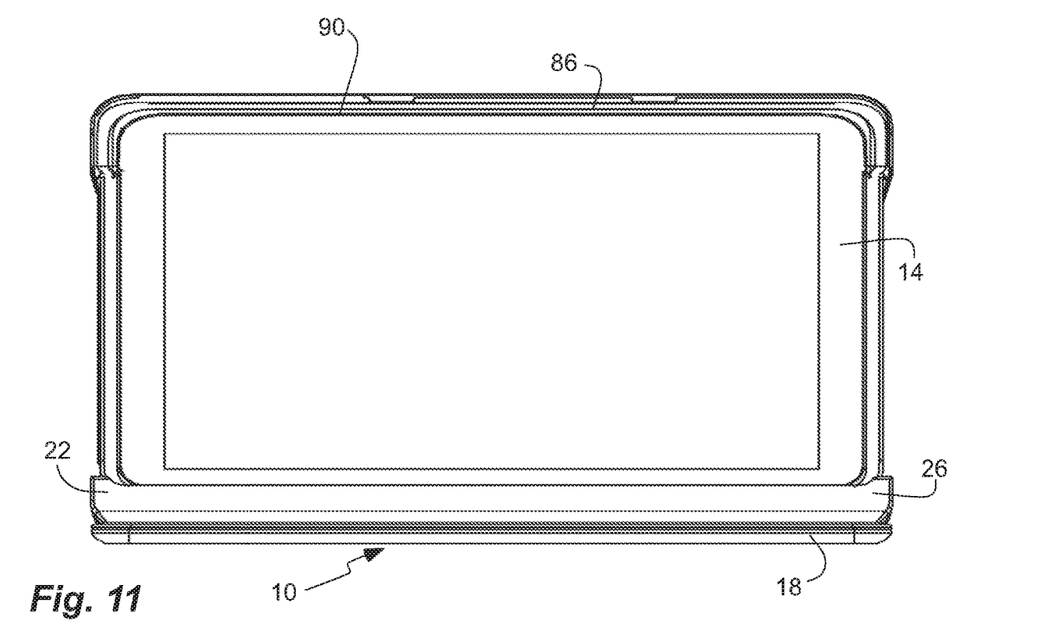
FIG. 11 is a front view of the keyboard folio of FIG. 1a, shown with the tablet computer therein.
Figure 12:
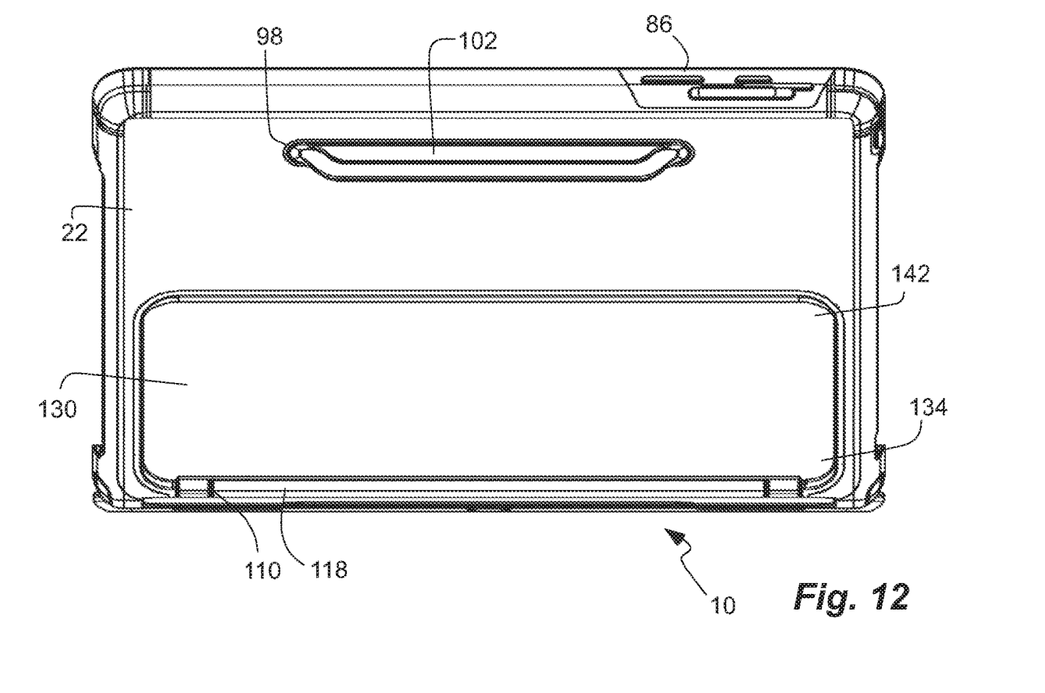
Figure 13:
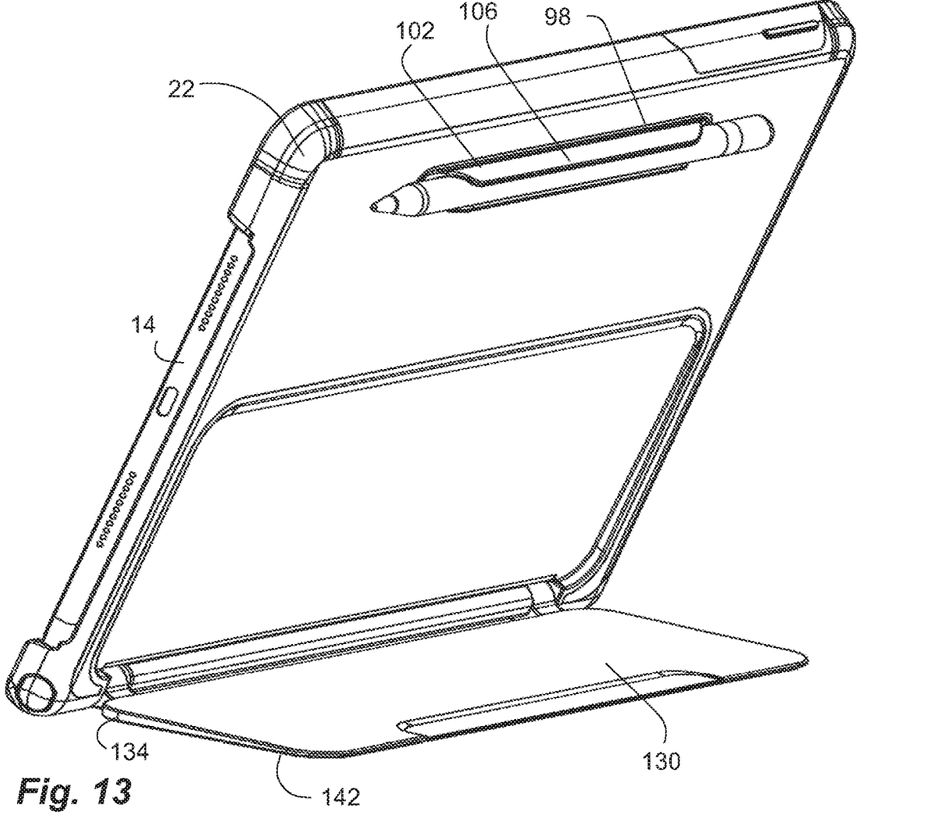
FIG. 13 is a rear perspective view of the keyboard folio of FIG. 1a, shown with a kickstand in a deployed orientation.
Figure 14:
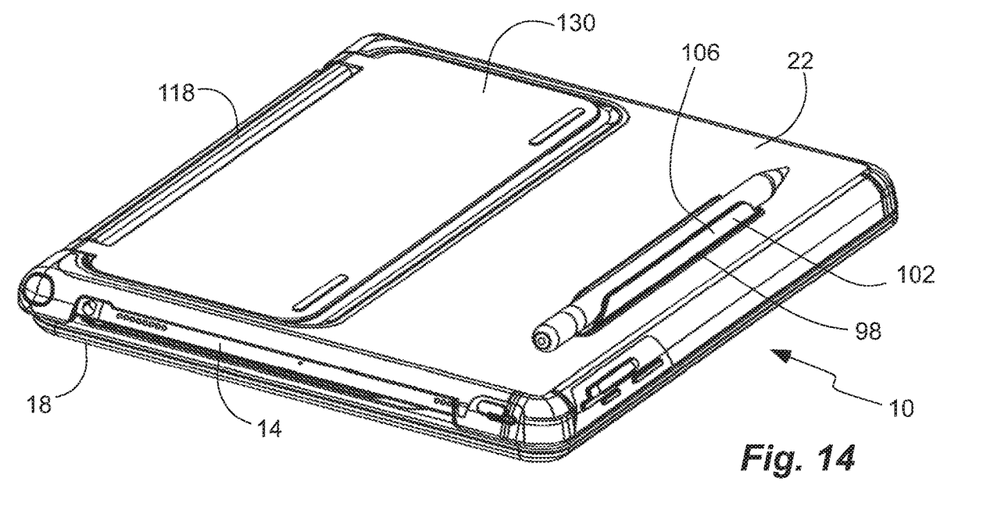
FIG. 14 is a rear perspective view of the keyboard folio of FIG. 1a, shown with the kickstand in a retracted orientation.
Figure 15:
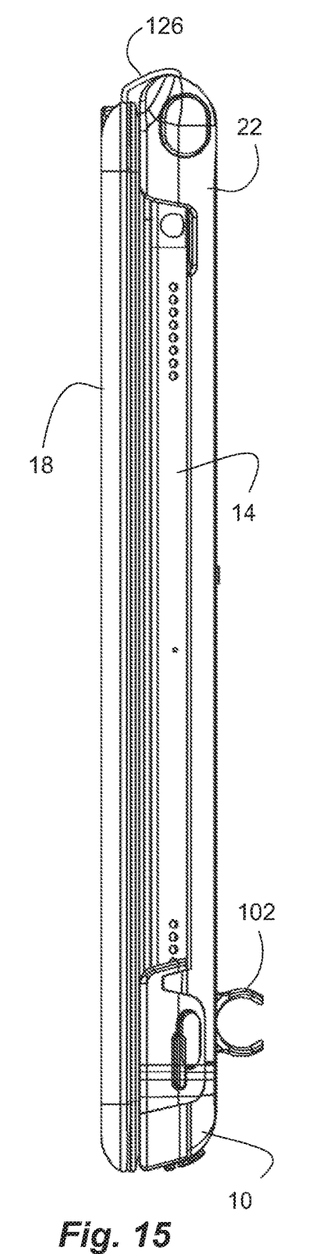
FIG. 15 is a side view of the keyboard folio of FIG. 1a, shown in the closed configuration.
Figure 16:
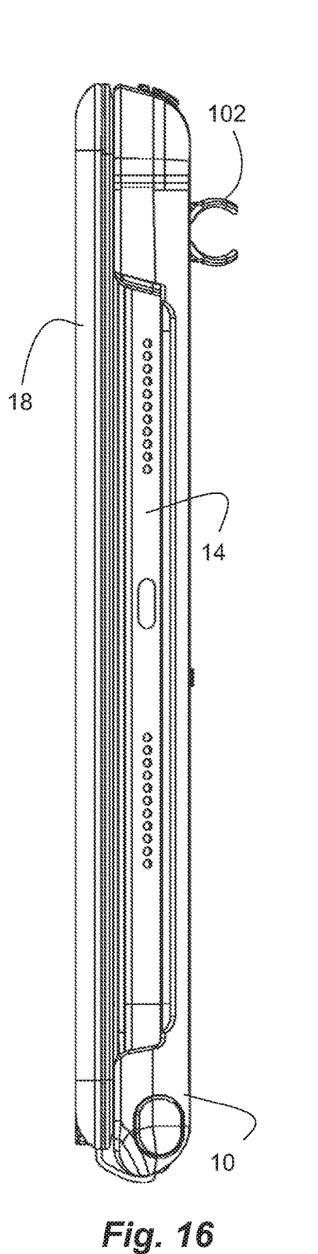
FIG. 16 is an opposite side view of the keyboard folio of FIG. 1a, shown in the closed configuration.

The bottom ledge 24 of the panel 22 can have an elongated notch 110 (FIG. 6). The elongated notch 110 can be an elongated recess. The elongated notch 110 can be partially cylindrical and open. The elongated notch 110 can face outwardly towards a bottom and a rear of the panel 22. In addition, the bottom ledge 24 can carry ferromagnetic elements 114 (FIG. 6) at the elongated notch 110.

The wireless keyboard 18 has an attachment bar 118 (FIG. 1b) releasably coupled to the bottom ledge 26 of the panel 22. The attachment bar 118 has ferromagnetic elements 122 magnetically couplable to the ferromagnetic elements 114 of the elongated notch 110 of the bottom ledge 26 of the panel 22.

Figure 1A:
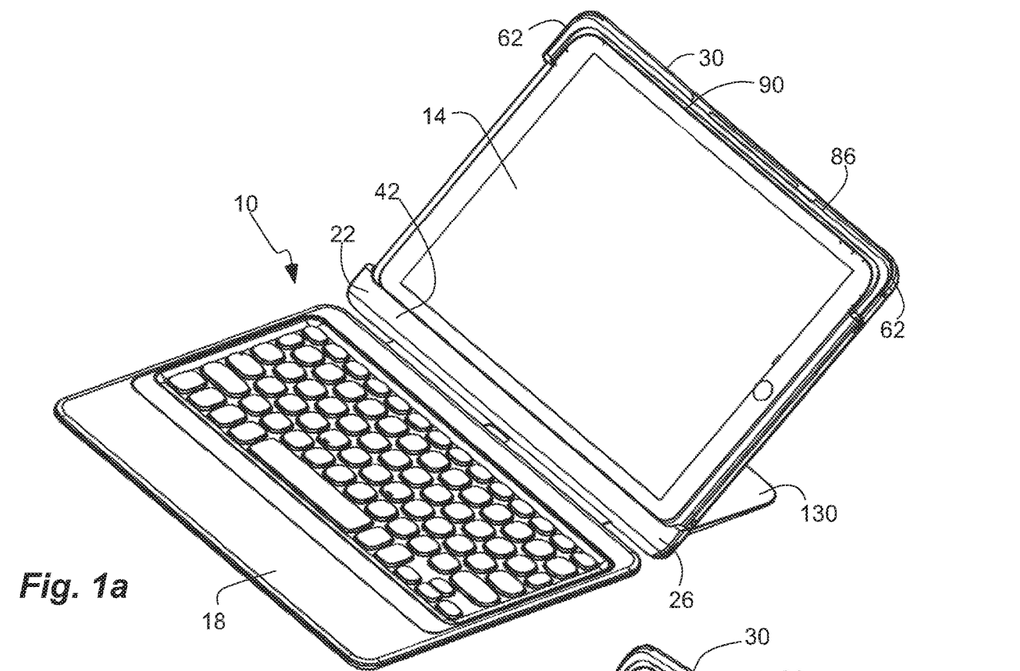
FIG. 1a is a perspective view of a keyboard folio in accordance with an embodiment of the invention, shown with a tablet computer therein, and shown with a wireless keyboard and a panel of the keyboard folio in an attached configuration and in an open position.
Figure 1B:
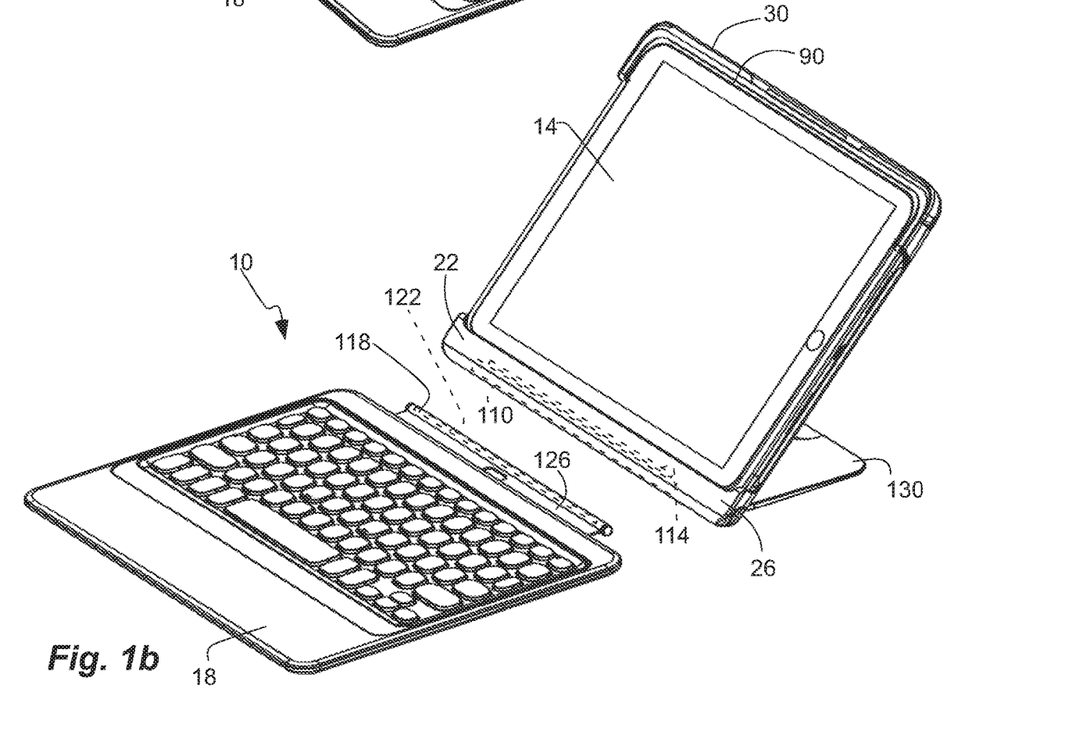
FIG. 1b is a perspective view of the keyboard folio of FIG. 1a, shown with the tablet computer therein, and shown with the wireless keyboard and the panel of the keyboard folio in a detached configuration and in the open position.
Figure 2:
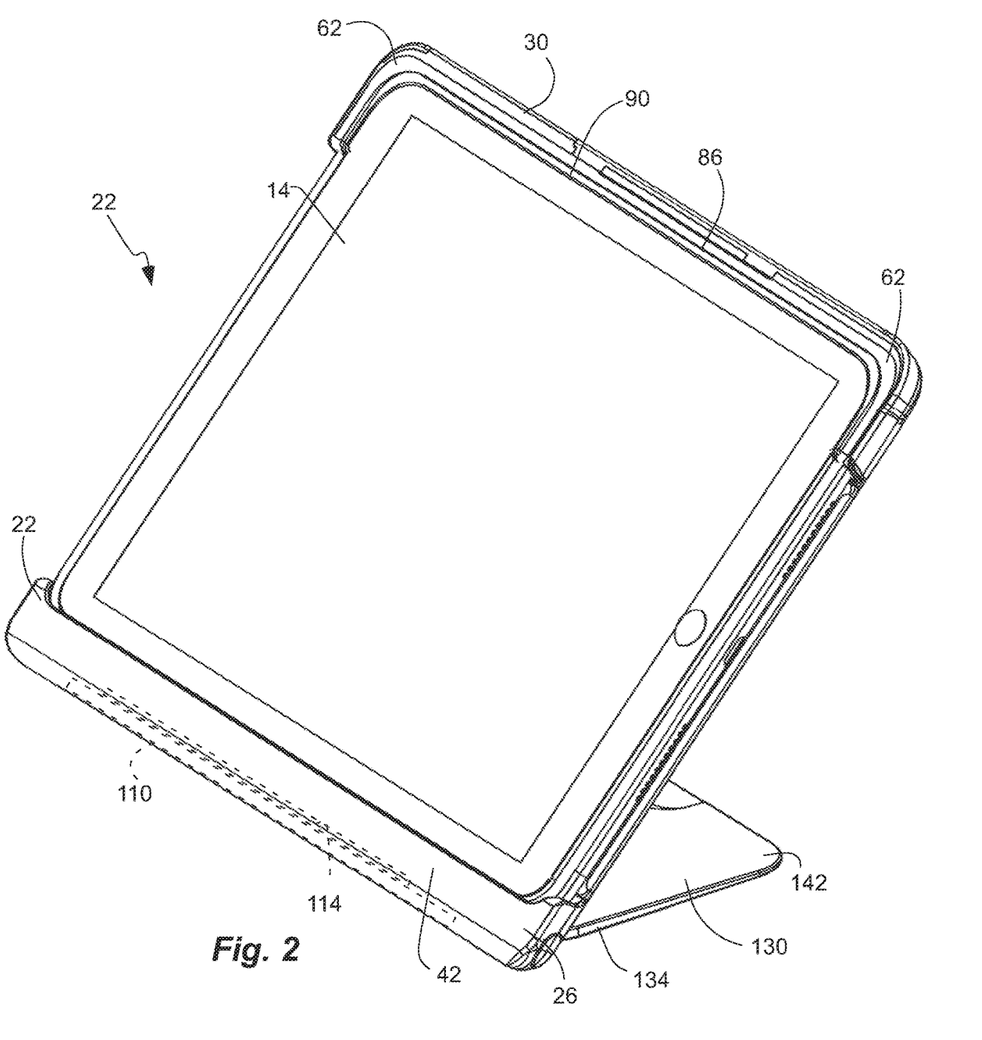
FIG. 2 is a perspective view of the panel of the keyboard folio of FIG. 1a, shown with the tablet computer therein, and with the wireless keyboard in the detached configuration.

The ferromagnetic elements 122 can be embedded in the attachment bar 118. The attachment bar 118 can be cylindrical to match and mate with, and to be removably disposed in, the elongated notch 110 of the bottom ledge 26 of the panel 22. The elongated notch 110 and the elongated bar 118 can have substantially equal lengths. Ferromagnetic elements 122 carried by the attachment bar 118 are magnetically couplable to the ferromagnetic elements 114 of the elongate notch 110 of the bottom ledge 26 of the panel 22. The wireless keyboard 18 and the panel 14 can have two configurations, including: 1) an attached configuration (FIG. 1a), and 2) a detached configuration (FIG. 1b). In the attached configuration, the wireless keyboard 18 is magnetically coupled to the panel 22 with the ferromagnetic elements 122 of the attachment bar 118 of the wireless keyboard 18 magnetically coupled to the ferromagnetic elements 114 of the elongated notch 110 of the bottom ledge 26 of the panel 22, and with the elongated bar 118 of the wireless keyboard 18 received in the elongated notch 110 of the bottom ledge 26 of the panel 22. In the detached configuration, the wireless keyboard 18 is separated from the panel 22, and the elongated bar 118 of the wireless keyboard 18 is removed from the elongated notch 110 of the bottom ledge 26 of the panel 22.

In addition, the wireless keyboard 18 can be pivotally coupled to the attachment bar 118 by a flexible hinge and flexible strip 126. The hinge and the strip 126 can pivotally and/or flexible couple the keyboard panel 18 and the attachment bar 118, and thus the panel 22 and tablet 14, together. In one aspect, the flexible hinge and the flexible strip 126 can be or can comprise a strip of fabric. The fabric can extend around the attachment bar 118. The flexible hinge can be free of electrical connections between the keyboard panel and the attachment bar 118. The hinge and the strip 126 can extend around a bottom of the panel 22 in the closed configuration.

The wireless keyboard 18 can have an alphanumeric keyboard. The wireless keyboard 18 can have a housing containing and/or carrying components of the wireless keyboard, such as a processor, a digital memory device, a transceiver, and a battery. The housing can be formed of plastic, and can be formed by injection molding.

As described above, the wireless keyboard 18 and the panel 22 can pivot with respect to one another between at least two orientations, including: a closed orientation and an open orientation. In the closed orientation, the wireless keyboard 18 is against the panel 22, and extends across the panel, and thus the tablet 14 to protect a front or display of the tablet 14. The panel 22, or the corner thereof, can have ferromagnetic elements that magnetically coupled to corresponding ferromagnetic elements in the keyboard 18 to maintain the folio 10 in a closed configuration. In the open orientation, the wireless keyboard 18 is at an obtuse angle with respect to the panel 22, and the tablet 14. In addition, the wireless keyboard 18 is inclined at an acute angle with respect to horizontal (and the support surface).

Figure 5:
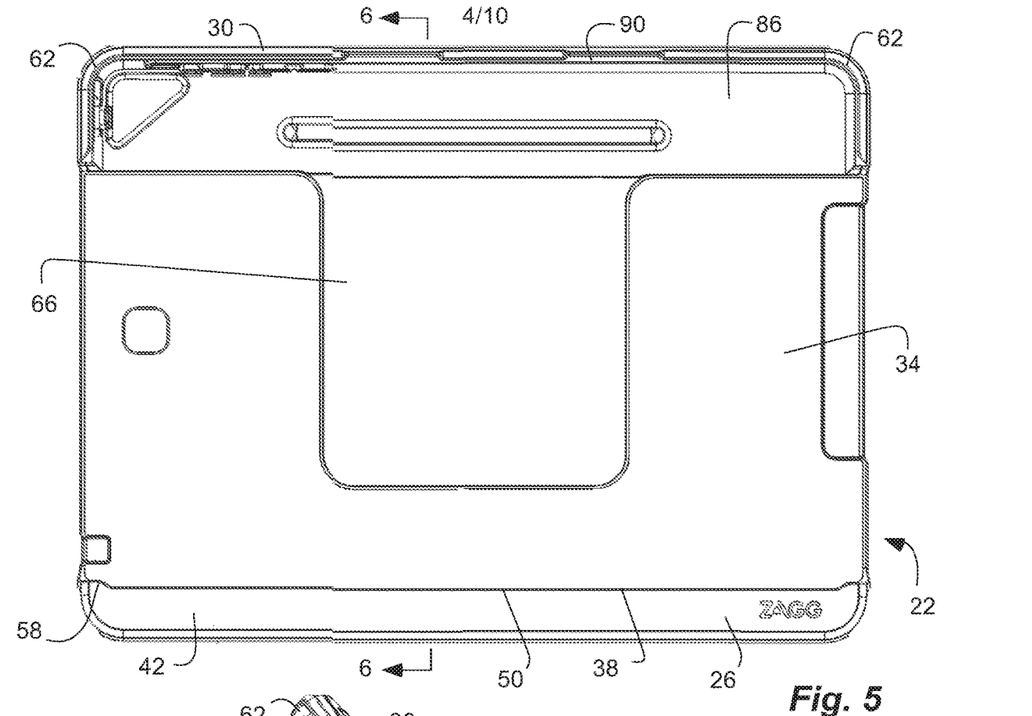
FIG. 5 is a front view of the panel of the keyboard folio of FIG. 1a, shown with the tablet computer removed, and showing an insert therein.

The folio 10 and/or the panel 22 can also have a kickstand 130 pivotally coupled to the panel 22 near or at the bottom or the bottom ledge 26 of the panel 22, and near or at the bottom edge of the panel 22. Thus, the kickstand 130 can be pivotally coupled to the bottom edge of the panel 22. The kickstand 130 pivots with respect to the panel 22 between: a retracted orientation (FIGS. 6, 9, 14 and 18), and multiple deployed orientations (FIGS. 1a-2, 12 and 13). In the retracted orientation, the kickstand 130 is adjacent the panel 22. In the deployed orientation, the kickstand 130 is at an acute angle with respect to the panel 22. The kickstand 130 having a plurality of different deployed orientations in which the kickstand 130 forms different acute angles with respect to the panel 22. In addition, the kickstand 130 can be disposed on and parallel with the support surface, because the kickstand 130 is pivotally coupled to the bottom edge of the panel 22. The kickstand 130 can be formed of a substantially planar flap. In one aspect, the kickstand 130 can have a variable thickness with a thicker end 134 at a hinge 138 (FIG. 17) between the kickstand 130 and the panel 22, and a narrower end 142 at an opposite distal free end so that the kickstand 130 does not interfere with the ferromagnetic elements 70 in the panel 22, as shown in FIG. 5.

Figure 17:
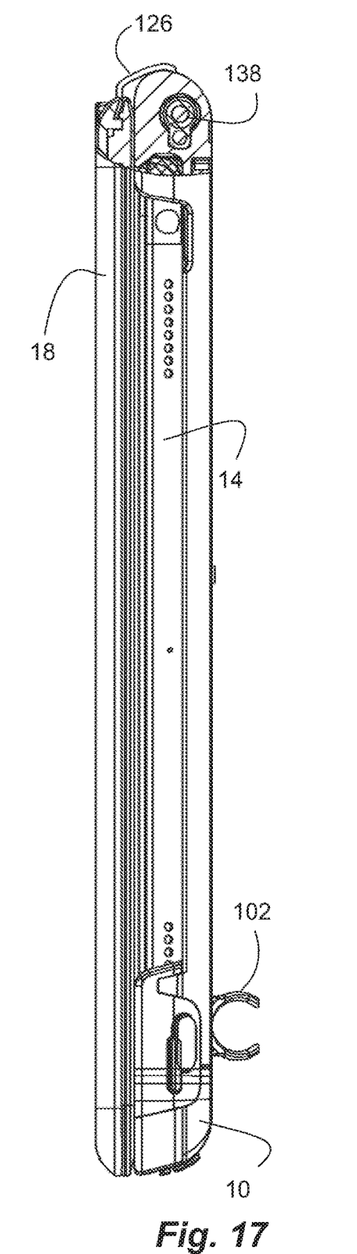
FIG. 17 is a partial side view of the keyboard folio of FIG. 1a, shown with a portion removed to illustrate a hinge of the kickstand.
Figure 18:
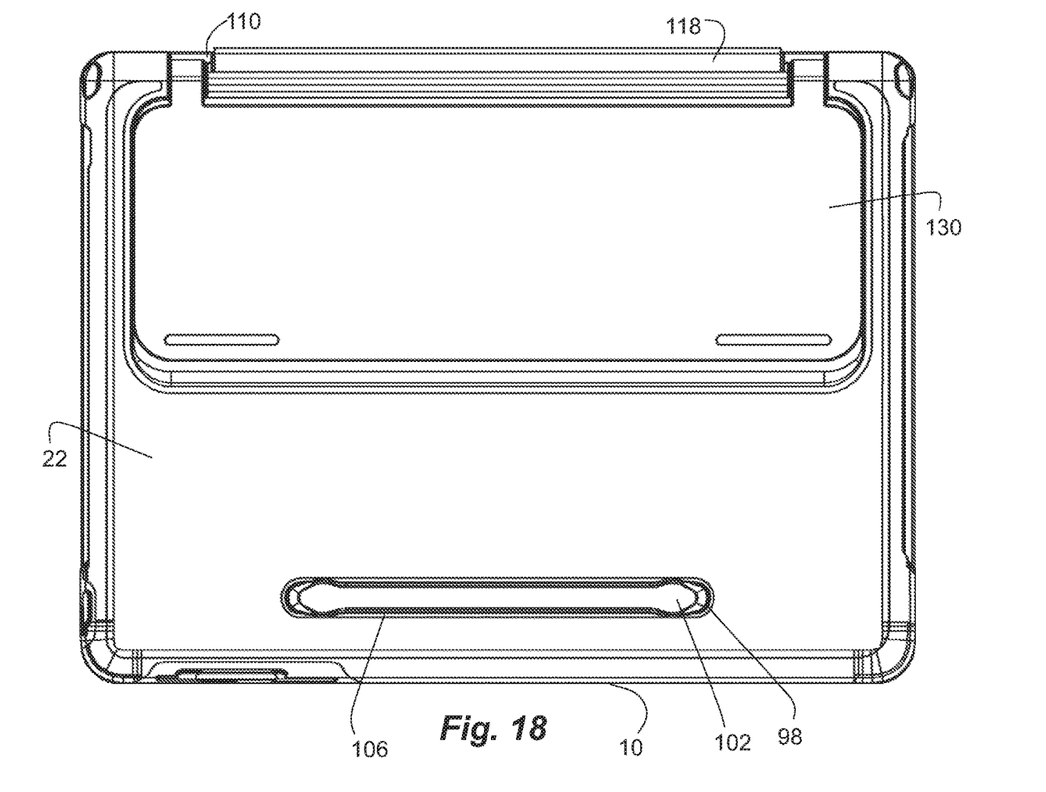
Figure 19:
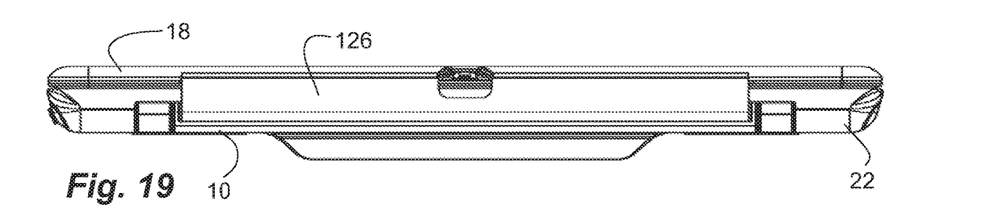
FIG. 19 is a rear view of the keyboard folio of FIG. 1a, shown in the closed configuration.
Figure 20:
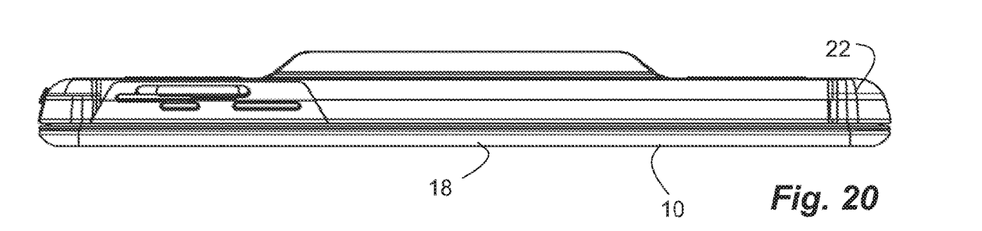
FIG. 20 is a front view of the keyboard folio of FIG. 1a, shown in the closed configuration.

A resistance hinge 138 is coupled between the kickstand 130 and the panel 22. The hinge 138 has a head with a cross-sectional shape mating with the cross-sectional shape of the bore so that the head is fixedly retained within the bore and with respect to the kickstand 130. The hinge 138 also has a key rotatable with respect to the head and having a cross-sectional shape mating with the cross-sectional shape of the slot so that the key is fixedly retained within the slot and with respect to the panel 22. The slot is aligned with the bore allows for installation of the resistance hinge. A cross-sectional size of the slot is larger than a cross-sectional size of the bore so that the hinge is capable of being inserted into the slot through the perimeter side of the panel 22 until the head is retained in the bore of the lobe of the kickstand 130, and the key is retained in the slot of the panel 22. The hinge 139 can comprise a pair of hinges on opposite sides of the kickstand 130. The hinges 138 can have auto lock and can be pressed in. Various aspects of the hinges are found in U.S. Pat. No. 9,557,776, which is hereby incorporated herein by reference The elongated slot 114 for receiving the bar 118 can be bound on opposite sides by the hinges 138. Thus, the hinges 138 and the bar 118 can be substantially co-linear for a compact design.

The wireless keyboard 18 can have an alphanumeric keyboard with keys that are dished.

The wireless keyboard 18 can also have a wireless mouse 200 wirelessly connected to the keyboard so that when the keyboard pairs with the tablet 14, the mouse also pairs with the tablet. The keyboard can be switched (switch pairing) between the tablet 14 and another computer, and the mouse will follow.

As described above, they wireless keyboard 18 can comprise a processor coupled to the alphanumeric keyboard, a digital memory device, a wireless transceiver coupled to the processor and/or the digital memory device, and capable of sending keystrokes from the alphanumeric keyboard, and a battery power source coupled to the transceiver and the processor. In one aspect, the processor can be electrically and operatively coupled to the keys of the alphanumeric keyboard, the battery power source, the wireless transceiver, and the digital memory device. In another aspect, the processor can include the wireless transceiver and/or the digital memory device, and can be electrically and operatively coupled to the keys and the battery power source. The wireless keyboard is operable to receive keystrokes from a user and wirelessly transmit the keystrokes to the tablet computer. The transceiver of the wireless keyboard can wirelessly connect and communicate with a wireless transceiver of the tablet or other computing device. The processor, digital memory device, wireless transceiver and the battery can be disposed in the housing of the keyboard panel.

The wireless keyboard 18 can further comprise at least two buttons in one aspect, or at least three buttons in another aspect, disposed on the keyboard panel, and associated with different wireless connections between at least two different computing devices, including the tablet computer 22 and another computing device, such as a desktop computer, a cellular phone, or another tablet. The keyboard can be configured to toggle between a plurality of wireless connections with a plurality of computing devices. The keyboard can have a switching mechanism to switch between typing on different computing devices. In one aspect, at least two buttons can be disposed on the keyboard panel and associated with different wireless connections between at least two different computing devices. In another aspect, at least three buttons can be disposed on the keyboard panel and associated with different wireless connections between at least three different computing devices, including a desktop computer, a tablet computer, and a cellular phone. The keyboard can have a switching mechanism, which would allow the user to switch between typing on a smart phone, tablet or regular computer.

It is to be understood that the examples set forth herein are not limited to the particular structures, process steps, or materials disclosed, but are extended to equivalents thereof as would be recognized by those ordinarily skilled in the relevant arts. It should also be understood that terminology employed herein is used for the purpose of describing particular examples only and is not intended to be limiting.

Furthermore, the described features, structures, or characteristics may be combined in any suitable manner in one or more examples. In the description, numerous specific details are provided, such as examples of lengths, widths, shapes, etc., to provide a thorough understanding of the technology being described. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the invention in one or more particular applications, it will be apparent to those of ordinary skill in the art that numerous modifications in form, usage and details of implementation can be made without the exercise of inventive faculty, and without departing from the principles and concepts described herein. Accordingly, it is not intended that the invention be limited, except as by the claims set forth below.

What is claimed is:

1. A keyboard folio configured for a tablet computer, the keyboard folio comprising:
   a) a panel configured to receive the tablet computer, and comprising a perimeter, a bottom ledge configured to receive the tablet computer thereon, an intermediate portion within the perimeter, and an interior face configured to oppose a back of the tablet computer when received by the panel;
   b) a recess in the intermediate portion of the panel and extending into the interior face;
   c) a ferromagnetic element carried by the intermediate portion of the panel at a bottom of the recess;
   d) an attachment plate removably positioned in the recess;
   e) an adhesive disposed on the attachment plate configured to adhere the attachment plate to the tablet computer;
   f) the attachment plate having a ferromagnetic characteristic to magnetically attach the attachment plate to the panel in the recess, and configured to magnetically attach the tablet computer to the panel;
   g) the attachment plate having a size and shape substantially matching a size and shape of the recess; and
   h) the recess having a depth to match a thickness of the plate configured so that the back of the tablet computer is flush with the interior face of the panel; and
   i) a wireless keyboard pivotally attached to the panel, the wireless keyboard and the panel pivoting between a closed position in which the panel is oriented opposite the wireless keyboard, and an open position in with the panel is oriented transvers to the wireless keyboard.

2. The keyboard folio in accordance with claim 1, further comprising:
   the bottom ledge having a transverse lip oriented substantially perpendicularly to the interior face of the panel and configured to oppose an edge of the tablet computer.

3. The keyboard folio in accordance with claim 1, further comprising:
   the bottom ledge extending beyond the interior face of the panel and having a forward face substantially parallel with the interior face of the panel.

4. The keyboard folio in accordance with claim 1, wherein the bottom ledge extends an entire width of the panel.

5. The keyboard folio in accordance with claim 1, further comprising:
   a) the wireless keyboard being magnetically coupled to the panel;

b) an elongated notch in the bottom ledge of the panel;
c) a ferromagnetic element carried by the bottom ledge at the elongated notch;
d) an attachment bar associated with the wireless keyboard, and removably disposable in the elongated notch of the bottom ledge;
e) a ferromagnetic element carried by the attachment bar magnetically couplable to the ferromagnetic element of the bottom ledge of the panel, the wireless keyboard and the panel having two configurations, including:
  i) an attached configuration in which the wireless keyboard is magnetically coupled to the panel with the ferromagnetic element of the attachment bar of the wireless keyboard magnetically coupled to the ferromagnetic element of the elongated notch of the bottom ledge of the panel, and with the elongated bar of the wireless keyboard received in the elongated notch of the bottom ledge of the panel, and
  ii) a detached configuration in which the wireless keyboard is separated from the panel, and the elongated bar of the wireless keyboard is removed from the elongated notch of the bottom ledge of the panel.

6. The keyboard folio in accordance with claim 5, further comprising:
a) the attachment bar being pivotally coupled to the wireless keyboard; and
b) a flexible strip coupled to and between the attachment bar and the wireless keyboard.

7. The keyboard folio in accordance with claim 6, wherein the flexible strip is a flexible hinge flexibly coupling the keyboard panel and the attachment bar, and wherein the keyboard hinge is free of electrical connections between the keyboard panel and the attachment bar.

8. The keyboard folio in accordance with claim 7, wherein the flexible hinge comprises a strip of fabric that extends around the attachment bar.

9. The keyboard folio in accordance with claim 1, further comprising:
a) a kickstand pivotally coupled to the bottom edge of the panel;
b) the kickstand pivoting with respect to the panel between:
  i) a retracted orientation in which the kickstand is adjacent to the panel and parallel with the panel, and
  ii) a deployed orientation in which the kickstand is at an acute angle with respect to the panel, and is substantially parallel with a support surface, the kickstand having a plurality of different deployed orientations in which the kickstand forms different acute angles with respect to the panel; and
c) the kickstand having a variable thickness with a thicker end at a hinge between the kickstand and the panel, and a narrower end at an opposite distal free end.

10. The keyboard folio in accordance with claim 1, further comprising:
a) an insert removably coupled to the panel at a top side of the panel and disposed between the top edge of the panel and the bottom ledge of the panel; and
b) the insert having a top edge opposite the bottom edge of the panel and removably positioned between the top edge of the panel and the bottom ledge of the panel; and
c) both the top edge of the insert and the top edge of the panel oppose the bottom ledge of the panel with a distance between the bottom ledge of the panel and the top edge of the panel being greater than a distance between the bottom ledge of the panel and the top edge of the insert, with the insert configured to fill a gap between the top edge of the panel and a top edge of the tablet computer.

11. The keyboard folio in accordance with claim 10, further comprising:
a) the panel having an interior face configured to oppose the back of the tablet computer;
b) a slot extending through the interior face of the panel near the top end; and
c) a tab extending from the insert and into the slot.

12. The keyboard folio in accordance with claim 11, further comprising:
a loop or channel disposed on the tab and positioned on a back side of the panel and configured to receive a stylus.

13. The keyboard folio in accordance with claim 10, wherein the insert is more flexible than the panel.

14. The keyboard folio in accordance with claim 1, further comprising:
a) a plurality of different inserts separately and selectively couplable to the panel and at a top side of the panel; and
b) each of the plurality of different inserts having a different size and shape configured to match and mate with a different tablet computer.

15. A keyboard folio configured a tablet computer, the keyboard folio comprising:
a) a panel configured to receive the tablet computer, and comprising a perimeter, a bottom ledge configured to receive the tablet computer thereon, and a top edge opposing the bottom ledge;
b) a plurality of different inserts separately and selectively couplable to the panel at a top side of the panel and disposed between the top edge of the panel and the bottom ledge of the panel, each of the plurality of different inserts having a different size and shape configured to match and mate with a different tablet computer;
c) each insert being more flexible than the panel;
d) a select insert having a top edge opposing the bottom ledge of the panel and removably positioned between the top edge of the panel and the bottom ledge of the panel;
e) both the top edge of the select insert and the top edge of the panel oppose the bottom ledge of the panel with a distance between the bottom ledge of the panel and the top edge of the panel being greater than a distance between the bottom ledge of the panel and the top edge of the select insert, with the select insert configured to fill a gap between the top edge of the panel and a top edge of the tablet computer; and
f) a wireless keyboard pivotally attached to the panel, the wireless keyboard and the panel pivoting between a closed position in which the panel is oriented opposite the wireless keyboard, and an open position in with the panel is oriented transvers to the wireless keyboard.

16. The keyboard folio in accordance with claim 15, further comprising:
a) the panel having an interior face configured to oppose the back of the tablet computer;
b) a slot extending through the interior face of the panel near the top end; and
c) a tab extending from the select insert and into the slot.

17. The keyboard folio in accordance with claim 16, further comprising:
a loop or channel disposed on the tab and positioned on a back side of the panel and configured to receive a stylus.

18. A keyboard folio in combination with a tablet computer, the keyboard folio comprising:
   a) a panel removably receiving the tablet computer, and comprising a perimeter, a bottom ledge receiving the tablet computer thereon, an intermediate portion within the perimeter, a top edge opposing the bottom ledge, and an interior face opposing a back of the tablet computer when the tablet computer is received by the panel;
   b) an insert removably coupled to the panel at a top side of the panel and filling a gap between the top edge of the panel and a top edge of the tablet computer;
   c) the insert being more flexible than the panel;
   d) the insert having a top edge opposing the bottom ledge of the panel and removably positioned between the top edge of the panel and the bottom ledge of the panel;
   e) a recess in the intermediate portion of the panel and extending into the interior face;
   f) a ferromagnetic element carried by the intermediate portion of the panel at a bottom of the recess;
   g) an attachment plate removably positioned in the recess;
   h) an adhesive disposed on the attachment plate configured to adhere the attachment plate to the tablet computer;
   i) the attachment plate having a ferromagnetic characteristic to magnetically attach the attachment plate to the panel in the recess, and configured to magnetically attach the tablet computer to the panel;
   j) the attachment plate having a size and shape substantially matching a size and shape of the recess; and
   k) the recess having a depth to match a thickness of the plate configured so that the back of the tablet computer is flush with the interior face of the panel; and
   l) a wireless keyboard pivotally attached to the panel, the wireless keyboard and the panel pivoting between a closed position in which the panel is oriented opposite the wireless keyboard, and an open position in with the panel is oriented transvers to the wireless keyboard.

19. The keyboard folio in accordance with claim 18, further comprising:
   a) the wireless keyboard being magnetically coupled to the panel;
   b) an elongated notch in the bottom ledge of the panel;
   c) a ferromagnetic element carried by the bottom ledge at the elongated notch;
   d) an attachment bar associated with the wireless keyboard, and removably disposable in the elongated notch of the bottom ledge;
   e) a ferromagnetic element carried by the attachment bar magnetically couplable to the ferromagnetic element of the bottom ledge of the panel, the wireless keyboard and the panel having two configurations, including:
      i) an attached configuration in which the wireless keyboard is magnetically coupled to the panel with the ferromagnetic element of the attachment bar of the wireless keyboard magnetically coupled to the ferromagnetic element of the elongated notch of the bottom ledge of the panel, and with the elongated bar of the wireless keyboard received in the elongated notch of the bottom ledge of the panel, and
      ii) a detached configuration in which the wireless keyboard is separated from the panel, and the elongated bar of the wireless keyboard is removed from the elongated notch of the bottom ledge of the panel.

* * * * *